Dec. 19, 1922.
J. WATERLOO.
MACHINE FOR CUTTING GLASS SHEETS OR LIKE ARTICLES.
FILED OCT. 10, 1919.

Witness
R H Balderson

Inventor
John Waterloo
by his attorneys

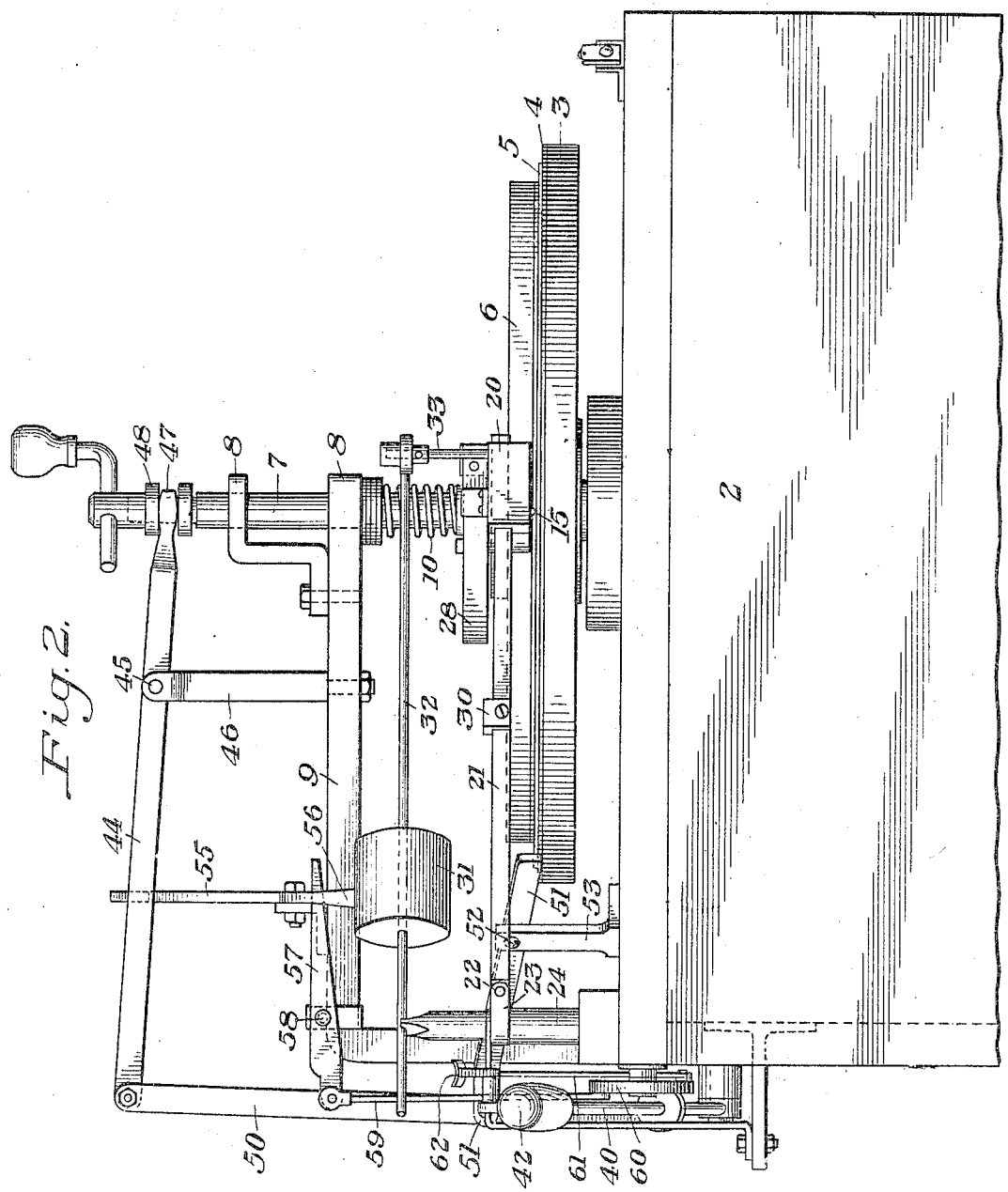

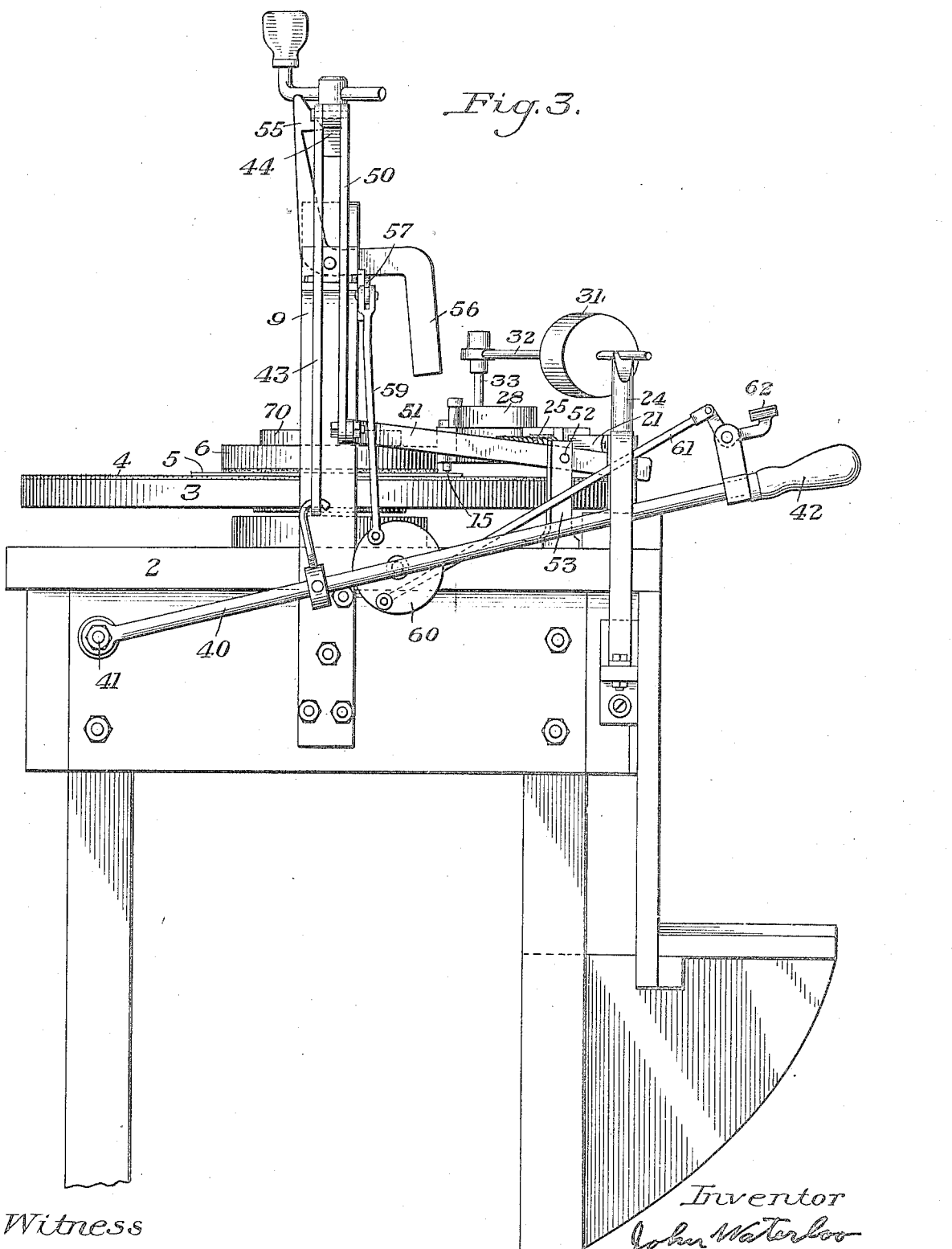

Dec. 19, 1922.
J. WATERLOO.
MACHINE FOR CUTTING GLASS SHEETS OR LIKE ARTICLES.
FILED OCT. 10, 1919.
1,439,043.
4 SHEETS—SHEET 4.
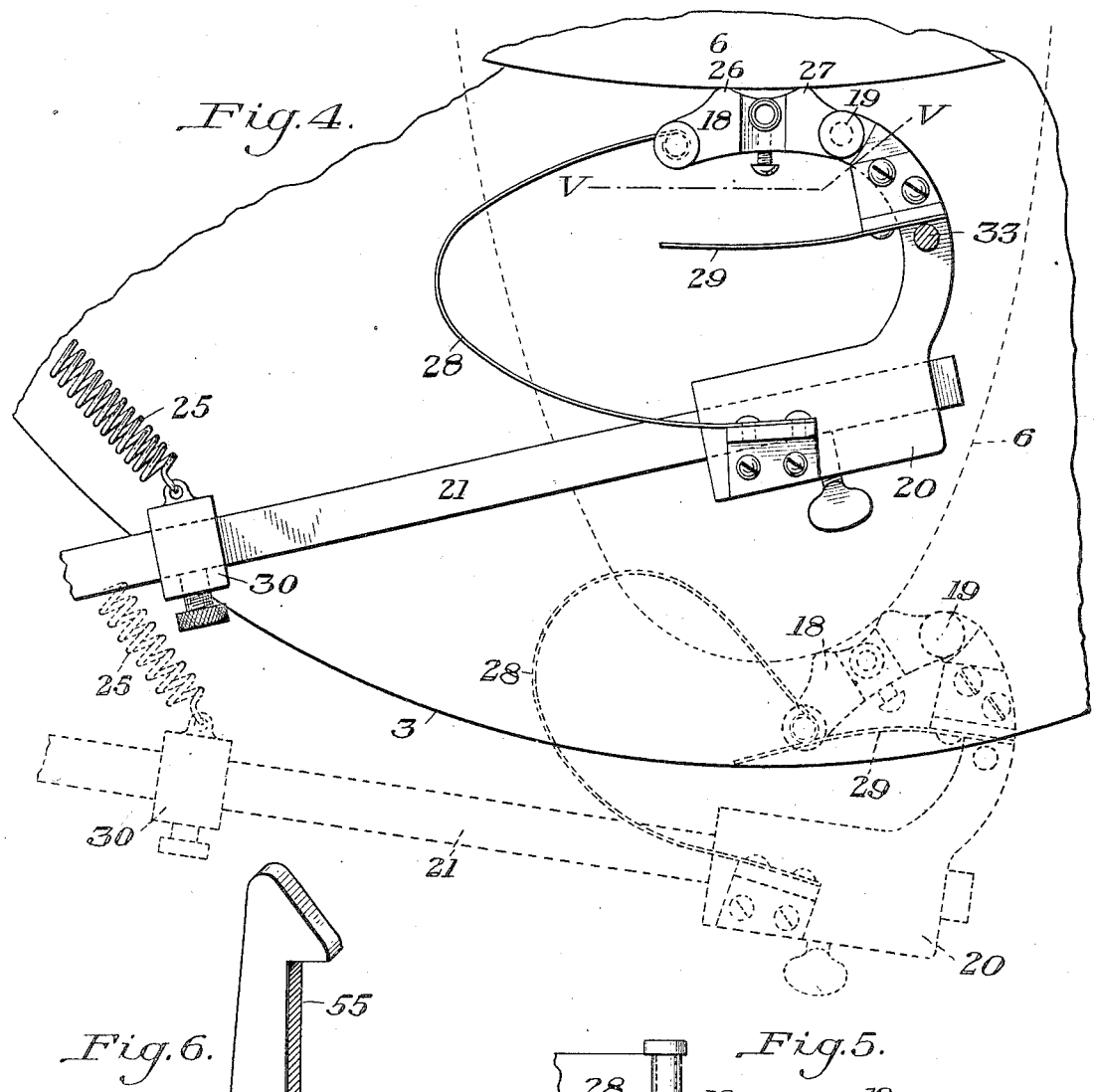
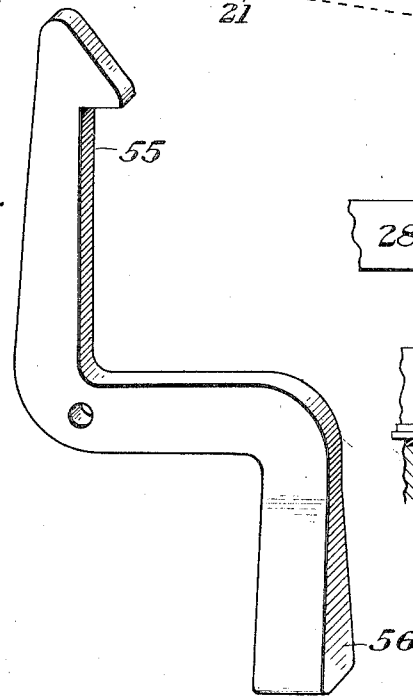
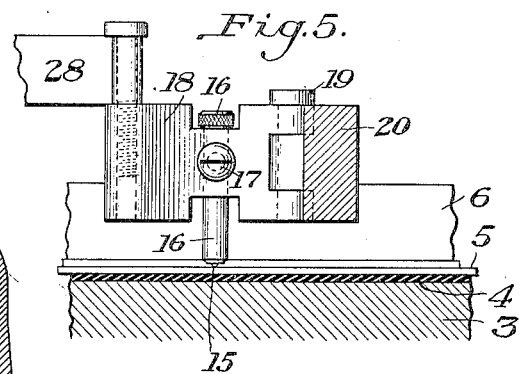
Witness
R. H. Balderson
Inventor
John Waterloo Patented Dec. 19, 1922.

1,439,043

UNITED STATES PATENT OFFICE.

JOHN WATERLOO, OF NEW EAGLE, PENNSYLVANIA, ASSIGNOR TO WINDOW GLASS MACHINE COMPANY, OF PITTSBURGH, PENNSYLVANIA, A CORPORATION OF NEW JERSEY.

MACHINE FOR CUTTING GLASS SHEETS OR LIKE ARTICLES.

Application filed October 10, 1919. Serial No. 329,708.

*To all whom it may concern:*

Be it known that I, JOHN WATERLOO, a resident of New Eagle, Washington County, Pennsylvania, have invented a new and useful Improvement in Machines for Cutting Glass Sheets or like Articles, of which the following is a full, clear, and exact description, reference being had to the accompanying drawings, forming part of this specification, in which—

Figure 2 is a front elevation of the machine;

Figure 3 is a side elevation;

Figure 4 is a detail plan view of the cutter support;

Figure 5 is a detail side elevation of the cutter support; and

Figure 6 is a detail perspective view of the latch.

Figure 1:
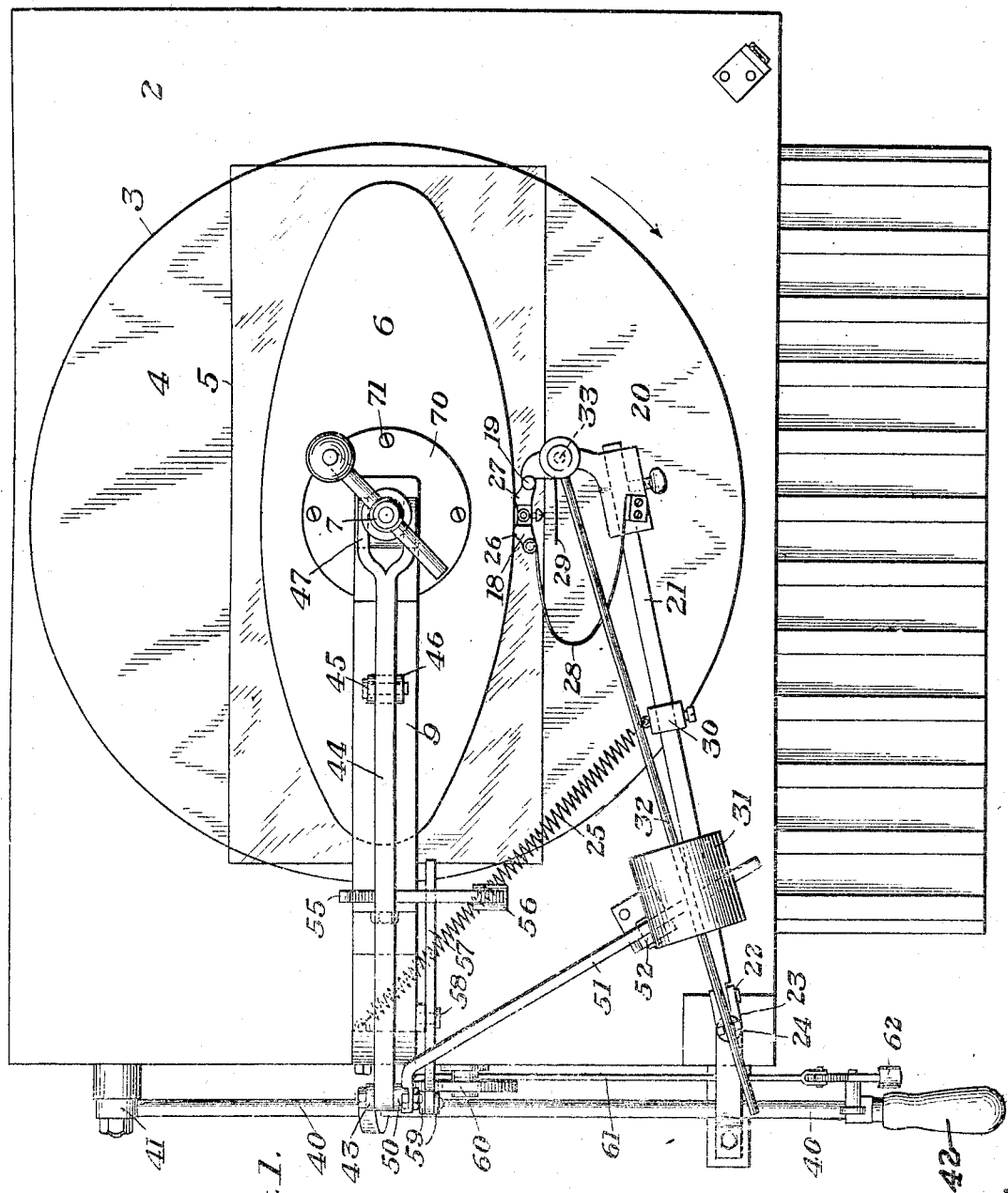
Figure 1 is a plan view of a machine embodying the invention.

The present invention relates to machines for cutting glass sheets or like articles.

The object of the invention is to produce a machine of this character in which sheets of widely different shapes may be cut rapidly and economically. With this object in view the invention consists in the machine hereinafter described, and particularly pointed out in the claims.

Referring to the embodiment of the invention illustrated in the drawings, the mechanism is mounted on a supporting table or bench 2. Mounted on the bench 2, so as to freely rotate, is a rotary table 3 for holding the sheet of glass or other material to be cut. The table 3 is preferably mounted on a spindle provided with ball bearings for free rotation. The table 3 is preferably made of iron for strength and permanence in shape. The top of the table has a rubber pad 4 for holding the sheet of glass to be cut, which is indicated by reference numeral 5.

A templet 6 is held against the top of the glass sheet 5. The bottom face of the templet is provided with a rubber facing or pad to firmly engage the glass. The cutting tool travels around the edge of the templet 6, the templet determining the shape of the article to be cut. In the drawings the templet 6 is illustrated as of a general oval or elliptical shape. However, templets of any other desired shape may be used. The templet 6 is carried on the lower end of a shaft 7, which is free to rotate in bearings 8 on the supporting arm 9. A spring 10 yieldingly holds the templet 6 against the glass on the rotary table. The sheet of glass is rotated with the table 3 and templet 6 and the article is cut out by a stationary cutter which is yieldingly pressed against and follows the outline of the templet. The cutter is preferably a diamond point 15, carried on a short finger or rod 16, which is adjustably held by set screw 17 in a swinging head 18. The head 18 is hinged at 19 to support block 20, carried on the end of a swinging arm 21. The arm 21 is hinged at 22 to a collar 23, rotatably carried on a post 24. The arm 21 is therefore free to move horizontally and vertically. A spring 25 draws the arm 21 so as to hold the cutting tool yieldingly against the templet 6.

The head 18 which carries the diamond point, has two bearing projections 26 and 27 which bear against the edge of the templet 6. The contact of the two points 26 and 27 against the edge of the templet 6, insures that the cutting of the diamond is properly directed, because as is well known, a diamond should be drawn only in the one direction for proper cutting. The swinging head 18 is maintained in proper relation to the templet 6 by means of two leaf springs 28 and 29. The leaf spring 28 is always in action, pressing the swinging head 18 against the edge of the templet. The spring 29 acts as an auxiliary spring, so that when the spring 28 is compressed to the position as shown for example in the dotted line of the position of the parts in Figure 4, in which it cannot exert an effective leverage about the hinge 19, the spring 29 assist in holding the swinging head against the edge of the templet. The block 20 is adjustably mounted on the arm 21. The spring 25 is connected with the arm 21 by means of a collar 30 adjustable along the arm 21 so as to vary the pressure of the cutting tool against the templet as exerted by the spring 25. The diamond point is held against the glass by the weight of the arm 21 and the associated parts, together with a weight 31 which is longitudinally adjustable on arm 32, which is supported at one end by a post 33 mounted on the cutting tool block 20. The other end of the arm 32 is carried on the top of the post 24. By adjusting the weight 31 along the arm 32, the proper downward cutting pressure may be applied to the diamond point 15.

In order to hold the templet 6 and the cutting tool away from the table when the work is being changed, the following mechanism is provided:—

A lever 40 is hinged at 41 on the bench 2 and has a handle 42 for the operative, who by manually pushing down on the handle 42 raises the templet and cutting tool. The lever 40 is connected by link 43 to a lever 44 fulcrumed at 45 upon a post 46 extending up from the supporting arm 9. The end of the lever 44 has a forked end 47 engaging a grooved collar 48 on the rotary shaft 7. As can readily be seen when the shaft 7 is raised against the tension of the spring 10, the templet 6 is lifted free from the work. Hung from the outer end of the lever 44 is a second link 50, the lower end of which is connected to a lever 51 fulcrumed at 52 upon a supporting post 53 projecting from the bench 2. The opposite end of the lever 51 projects under the tool carrying arm 21 so that when the handle 42 is depressed by the operator, the end of the lever 51 raises the tool carrying arm 21 and lifts the cutting tool free from the work.

The templet and cutting tool are locked in their elevated position by means of a latch 55, which is arranged to hook over the lever 44. This latch 55 has a counter-weight 56 so that when the left hand end of the lever 44 as viewed in Figure 2, is drawn downwardly the latch 55 automatically engages the top of the lever and holds the templet and cutting tool raised. The latch 55 is tripped by means of a lever 57 fulcrumed at 58 on the arm 9. The lever 57 is connected through a rod 59 to a wheel 60, which is in turn connected by a rod 61 to a thumb operated lever 62 mounted on the handle 42. The operator by depressing the lever 62 with his thumb may release the latch 55 and permit the templet 6 to be pressed by the spring 10 against the work and permit the cutting tool to be held by gravity against the work.

The operation of the machine is as follows:—

The operator depresses the handle 42 and places a sheet of glass 5 upon the rotary table 3. The operator then releases the latch 55 and lowers the templet 6 and the cutting tool against the top of the glass. The operator then turns the table 3. In the machine illustrated this turning is accomplished manually by the operator who grasps the edge of the table 3 with his hands and turns it. With the cutting tool mounted as in the illustrated embodiment, it is found preferable to turn the table in the direction indicated by the arrow in Figure 1, although it may be turned in the other direction. During the turning of the table the stationary cutting tool is yieldingly held against the edge of the templet 6 and travels around it, the diamond point scratching the glass. After the operator has given the lever one complete revolution, he raises the templet and cutting tool and removes the cut sheet and places a fresh sheet to be cut, repeating the operation. The templet 6, which is preferably of wood, is removably carried on the lower end of the rotary shaft 7 by means of a head 70 provided with screws 71. The templet 6 may be therefore easily removed and replaced by another templet of another size or shape. The machine therefore is universal and by supplying different templets may be used to cut a wide variety of shapes and sizes.

While I have illustrated the preferred embodiment of my invention, it is to be understood that the invention is not limited to its illustrated embodiment but may be embodied in other machines for cutting glass sheets or the like within the scope of the following claims.

I claim:

1. A machine for cutting glass sheets or the like, comprising, a rotary work table, a templet held against the work on the table and free to rotate therewith, a cutting tool, means for holding the tool against the edge of the templet to follow its outline, and means connected with the cutting tool and adapted to contact with the templet to direct the cutting point of the tool to face a direction parallel to the edge of the templet, substantially as described.

2. A machine for cutting glass sheets or the like, comprising, a rotary work table, a templet pressed against the work on the table and free to rotate therewith, and an arm yieldingly pressed toward the templet, and a tool holder pivotally mounted on the arm and bearing against the edge of the templet so as to maintain the cutting point facing a direction parallel to the edge of the templet, substantially as described.

3. A machine for cutting glass sheets or the like, comprising, a rotary work table, a templet held against the work on the table and free to rotate therewith, a swinging arm yieldingly pressed toward the edge of the templet, a cutting tool and a support for the cutting tool hinged to the end of the swinging arm and spring connections between the tool holder and arm for yieldingly pressing the tool holder against the edge of the templet, substantially as described.

4. A machine for cutting glass sheets or the like, comprising, a rotary work table, a templet held against the work on the table and free to rotate therewith, a cutting tool held against the edge of the templet arranged for cutting the work, and means for holding the templet and cutting tool away from the work to permit the work being replaced, substantially as described.

5. A machine for cutting glass sheets or the like, comprising, a work table, a templet yieldingly pressed against the work on the table, a cutting tool yieldingly pressed against the work and arranged to travel around the edge of the templet, and means for moving the templet and cutting tool away from the work to permit the work being replaced, substantially as described.

6. A machine for cutting glass sheets or the like, comprising, a rotary work table, a templet free to rotate with the work table and a spring for yieldingly pressing the templet against the work on the table, a cutting tool yieldingly held against the edge of the templet, and means for yieldingly pressing the cutting tool against the work, and manually controlled means for moving the templet and cutting tool away from the work to permit the work being replaced, substantially as described.

7. A machine for cutting glass sheets or the like, comprising, a rotary work table, a templet pressed against the sheet on the table and free to rotate therewith, a swinging arm yieldingly pressed toward the edge of the templet, a tool holder hinged at the end of said arm and having at least two points of contact for the edge of the templet, a yielding means for holding the tool holder against the edge of the templet while permitting it to turn about its hinge support and take the direction of the templet edge, and a cutting tool carried by the tool holder, substantially as described.

8. A machine for cutting glass sheets or the like, comprising, a work support, a templet pressed against the work on the support, a hinged tool holder yieldingly pressed against the edge of the templet and contacting therewith so as to take the direction of the templet edge, a cutting tool held by the tool holder, and means for causing relative movement of the cutting tool around the templet, substantially as described.

9. A machine for cutting glass sheets or the like, comprising, a work support, a templet pressed against the work on the support, a tool holder having at least two points arranged to be held against the edge of the templet, means for yieldingly holding the tool holder against the edge of the templet permitting it to turn so as to keep both of said points against the edge of the templet, means for relatively moving the tool holder and templet to cause the tool holder to travel along the edge of the templet, and a cutter carried by the holder for cutting the outline of the templet in the work, substantially as described.

10. A machine for cutting glass sheets or the like, comprising a work table, a templet held against the work on the table, a cutting tool, and means for relatively moving the tool and work table so that the tool follows the outline of the templet over the work, and means connected with the cutting tool and adapted to contact with the templet to direct the cutting point of the tool to face a direction parallel to the edge of the templet, substantially as described.

In testimony whereof, I have hereunto set my hand.

JOHN WATERLOO.